United States Patent
Mantell et al.

[15] 3,676,500
[45] July 11, 1972

[54] TERTIARY ALDEHYDE COMPOUNDS

[72] Inventors: Gerald J. Mantell, Allentwon, Pa.; Christian S. Rondestvedt, Jr., Wilmington, Del.

[73] Assignee: E. I. du Pont de Nemours and Company, Wilmington, Del.

[22] Filed: Jan. 26, 1967

[21] Appl. No.: 611,817

Related U.S. Application Data

[63] Continuation-in-part of Ser. No. 432,399, Feb. 12, 1965, which is a continuation of Ser. No. 65,259, Oct. 27, 1960, abandoned.

[52] U.S. Cl. ...................260/602, 260/283 R, 260/347.8, 260/302 R, 260/598, 260/530 R, 260/600, 252/522, 260/91.3 VA, 260/326.5 N, 260/298, 260/307 R

[51] Int. Cl. .......................................................C07c 47/18
[58] Field of Search............260/602, 598, 599, 346.1, 347.8

*Primary Examiner*—Leon Zitver
*Assistant Examiner*—R. H. Liles
*Attorney*—Francis J. Crowley

[57] ABSTRACT

As novel compositions of matter, $\beta$-alkoxy alde-hydes, such as $\beta$-isobutoxypivaladehyde, which, being like most aldehydes, are odoriferous compounds useable as aids in the composition of perfumes. The novel $\beta$-alkoxy aldehydes are also useful intermediates in the preparation of useful alcohols, carboxy acids, carboxy amides, etc. The novel $\beta$-alkoxy aldehydes of the invention are prepared by the unique vapor phase isomerization of meta-dioxanes catalyzed by weakly acidic surfaces such as pumice and silica gel.

1 Claim, No Drawings

TERTIARY ALDEHYDE COMPOUNDS

CROSS REFERENCES TO RELATED APPLICATIONS

This application is a continuation-in-part of our copending application, Ser. No. 432,399, filed Feb. 12, 1965, which in turn is a continuation of application, Ser. No. 65,259, filed Oct. 27, 1960, now abandoned.

BACKGROUND OF INVENTION

The novel $\beta$-alkoxy aldehydes of this invention are characterized by two distinguishing features:

1. The aldehyde radical —CHO is attached to a tertiary carbon radical, and
2. In a position $\beta$ with respect to the —CHO group, the compound bears an ether radical of the form OR, wherein R is an organic radical free of hydroxy groups and ionizable radicals.

The prior art does not describe $\beta$-alkoxy aldehydes characterized by the two distinguishing features enumerated above. U.S. Pat. No. 2,561,254, to Whetstone et al., is drawn to unsaturated ether aldehydes and acetals thereof. The aldehydes may be represented by the formula:

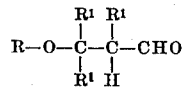

The carbon atom attached to the —CHO radical is not a tertiary carbon atom since it contains an attached hydrogen. U.S. Pat. No. 2,957,889, to Houghlin et al., is drawn to unsaturated $\beta$-alkoxy aldehydes and unsaturated $\beta$-alkoxy-ketones. The aldehydes may be represented by the formula:

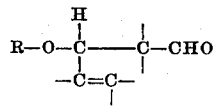

The aldehydes disclosed have the other oxygen attached to a carbon which is both tertiary and allylic.

DESCRIPTION OF THE INVENTION

The novel $\beta$-alkoxy aldehydes of this invention can be monoaldehydes or bis-aldehydes, and may be defined, respectively, by the two formulas:

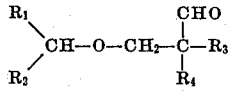

and

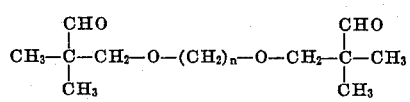

wherein
- $R_1$ is hydrogen, an alkyl group of one to 11 carbons, a vinyl group, cyclohexenyl, phenyl, isopropylphenyl, tolyl, trifluoromethylphenyl, chlorophenyl, dichlorophenyl, tetrahydrofuryl, 1,1,5-trimethyl-3-oxahexyl;
- $R_2$ is hydrogen, methyl or together with $R_1$, a divalent alkelene radical of four to five carbons;
- $R_3$ is an alkyl group of one to two carbons;
- $R_4$ is an alkyl group of one to three carbons, vinyl, allyloxymethyl or, together with $R_3$, a saturated or mono-olefinically unsaturated divalent aliphatic hydrocarbon radical of five carbons; and
- $n$ is an integer of from 3 to 5.

The novel aldehyde compounds of this invention can be prepared by a synthesis which involves splitting cyclic meta-dioxanes by the aid of certain specific mildly acidic solid catalysts. These catalysts are granular pumice and low-surface area silica gel.

The meta-dioxanes mentioned above may be defined by the formulas:

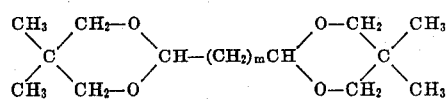

and

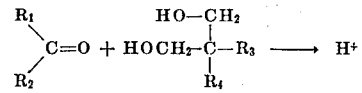

wherein $R_1$, $R_2$, $R_3$ and $R_4$ are as defined above, and $m=1$ to 3.

The meta-dioxanes, which may also be designated as cyclic acetals or ketals, can be prepared from an aldehyde, ketone, acetal or ketal as typified by the following two equations:

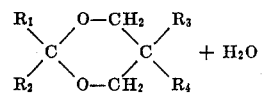

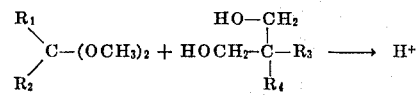

and

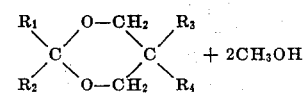

The above meta-dioxanes when heated at a temperature in the range of from 200° to 550° C. in contact with mildly acidic solid catalyst as specified herein undergo fission apparently according to the following scheme:

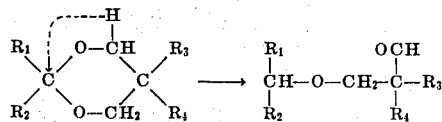

The operation of splitting is effected by conducting vapors of the selected initial material (cyclic acetal or ketal), preferably diluted with an inert gas such as nitrogen, argon or carbon dioxide, over the solid catalyst, heated to a temperature in the range of 200° to 550° C. Said initial materials are generally volatile solids or liquids. The reaction products are usually liquids. Accordingly, the reaction is best arranged to proceed in a pipe or column containing the solid catalyst in a heated portion thereof. The initial material, powder or liquid, may be swept into said receptacle at one end thereof by the aid of the carrier gas (e.g., $N_2$). It vaporizes as it approaches the reaction zone, undergoes splitting, and emerges as a gas, which cools to a liquid at the other end of the tubular reactor.

The useful catalysts are pumice and low-surface area silica gel. By low-surface area silica gel, we mean a granular solid form having a surface area of about 200 to 500 square meters per gram, preferably about 340 square meters per gram. Grades of higher-surface silica gels seem to induce only fragmentation of the cyclic acetal or ketal molecule instead of opening the ring at just one point, as desired in this invention.

While pumice and low-surface silica gel are interchangeable in most cases, there are exceptions, for example, silica gel is not useful when $R_1$ is a long chain alkyl, phenyl or alkylphenyl. Pumice, on the other hand, is less useful with the halogen containing phenyl groups in $R_1$. When pumice is used, the best results are usually obtained at 350° to 450° C. When silica gel is used, the best results are usually obtained at 250° to 375° C. Variations in the methods of preparing the novel compounds of this invention are fully illustrated in the examples below.

The rate of sweep of gas mixture through the catalyst bed is controlled best by observation of the results. Usually, a sweep slow enough to permit a contact-time between reactants and catalyst of 25 seconds to 2 minutes produces good results. But variations within very wide limits such as 10 seconds to 8 minutes are tolerable in this respect.

The novel compounds of this invention in general have the same utility ascribed to all aldehydes. For instance, they can be converted by methods recognized in the art, which methods are discussed more in detail hereinbelow, to alcohols, carboxy acids, carboxy amides, etc. They may be reacted with other compounds to produce imidiazoles, oxazoles, thiazoles, isoquinoles and various alkylidene compounds. The novel aldehydes are also odoriferous compounds and can be used in the composition of perfumes. The carboxy acids derived from the novel aldehydes by oxidation can be transformed into lithium salts which by virtue of the relatively highly-branched quaternary carbon atoms, are soluble in gasoline and accordingly can be used as anti-knock additives for hydrocarbon motor-fuel. Other advantages and practical utilities derivable therefrom will be readily apparent to those skilled in the art.

Without limiting this invention, the following examples are given to illustrate our preferred mode of operation. Parts mentioned are by weight.

PROCEDURE

The Catalyst

The catalyst employed in the examples below had the following characteristics and where treated as follows:
Silica gel: A commercial silica gel was used having the following characteristics:

| | |
|---|---|
| Pore volume | 1.16 ml./g. |
| Pore diameter (ave.) | 140 A° |
| Surface area | 340 sq. m/g. |

The silica gel was heated in a stream of nitrogen at 350° C. to expel water before use.

Pumice: The pumice employed was obtained from several sources, all of which appear to be equivalent. The material was screened and the 12 to 20 mesh material was retained. This was heated at about 400° C. in a nitrogen stream until dry before use.

Operation

The chosen catalysts were placed in reaction tubes made of heat resistant, borosilicate glass, 30 to 40 inches long and 0.75 to 1 inch in diameter. (Stainless steel, nickel and other heat-resistant metal tubes are also suitable.) The catalyst bed was usually 24 inches deep but was varied from 12 to 27 inches. The tube was mounted vertically, thermocouples were placed in contact with the tube and the tube was heated in an electric furnace. Suitable connections were made to the top of the tube for admitting the starting material and the sweep gas. A receiver was connected by suitable means for collecting the products, provision being made for the inert gas to escape through cold traps at −80° C.

The rate of the addition of the starting material was varied from 10 to 30 g./hr., but generally a rate of 15 to 20 g./hr. was used. An insert gas flow of 10 to 200 ml./min., generally 40 to 70 ml./min. was used. The production of non-condensable gases during the reaction was measured by comparing the volume of non-condensable gases leaving the reaction system with the volume of input sweep gas. In general, little or no gas was formed.

When the addition of starting material was complete, the inert gas flow was continued until all products had been removed from the reaction zone; usually, this required from 10 minutes to 1 hour.

The composition of the product was followed during the reaction by collecting small samples and determining the refractive index or infra-red spectrum. The reaction products were fractionally distilled and analyzed. Aldehyde derivatives were prepared, characterized and analyzed as a check on the product structure.

EXAMPLE 1

One hundred thirty-two and two-tenths parts of 2-isopropyl-5,5-dimethyl-1,3-dioxane (Monatsh. 51, 67) were fed over a period of 8 hours into a heated reaction zone comprising 57.5 grams of granular pumice in a bed 25.5 inches deep by 0¾-inch diameter. A nitrogen flow of 49 ml./min. and a reaction temperature of 410° to 416° C. were maintained. The pale yellow product weighed 123.2 grams. Fractional distillation of the product gave 16 percent by weight of unchanged starting material and 69 percent by weight of β-iso-butoxypivalaldehyde,

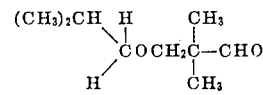

which had the following physical characteristics: boiling point (b.p.) = 88.1° C. at 43 mm., refractive index, $n_D^{25}$ = 1.4080.

The infrared spectrum of the product exhibited absorption bands at 3.66 microns (aldehyde C—H), 5.74 mierons (C = O), 8.95 microns (ether) and 11.2 and 12.9 microns, which bands are now known to be characteristic of β-alkoxy-tertiary aldehydes. The bands due to $CH_2$, CH and $CH_3$ were also present.

Analysis, Calcd. for $C_9H_{18}O_2$: C, 68.4; H, 11.4; Molecular Weight 158.

Found: C, 68.9, 68.5; H, 11.5, 11.6; Molecular Weight 162, 160.

Repetition of the same reaction at 350° C. with a material feed rate of 27 g./hr. and a nitrogen flow of 60 ml./min. gave a conversion of 56 percent and a yield of 91 percent.

Substitution of low surface silica gel for pumice at a reaction temperature of 337° to 352° C. in the above reaction system gave a 100 percent conversion and an 80 percent yield.

As indicated by the above percentages, part of the initial dioxane compound is recovered unchanged from the reaction mass, while another part apparently undergoes decomposition and does not yield the desired aldehyde. Accordingly, the conversion percentages above represent the difference between the initial material and the unreacted quantity recovered, expressed as a percentage by weight of the initial material. The yield represents the percentage of the tertiary-aldehyde product formed based on the weight of acetal converted.

Following the procedure indicated above the following cyclic acetals and ketals, were converted into the corresponding tertiary aldehydes, having the properties indicated below.

EXAMPLE 2

| | |
|---|---|
| Initial Material: | 5,5-Dimethyl-m-dioxane (Ann. 289, 44) |
| Catalyst: | Pumice |
| Reaction Temperature: | 400-440°C. |
| Product: | Methoxypivalaldehyde |

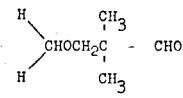

| | |
|---|---|
| Boiling Point: | 131°C. |
| Refractive Index: | $n_D^{25}$ = 1.4065 |
| Yield: | 73% |

EXAMPLE 3

| | |
|---|---|
| Initial Material: | 2,5,5-Trimethyl-m-dioxane |
| Catalyst: | Pumice |
| Reaction Temperature: | 380° - 400°C. |
| Product: | Ethoxypivalaldehyde |

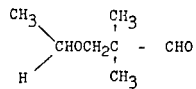

| | |
|---|---|
| Boiling Point: | 145° - 147°C. |
| Refractive Index: | $n_D^{25}$ = 1.4037 |
| Yield: | 72.7% |

EXAMPLE 4

| | |
|---|---|
| Initial Material: | 2-Isopropyl-5-methyl-5-n-propyl-m-dioxane |
| Catalyst: | Pumice |
| Reaction Temperature: | 392° - 410°C. |
| Product: | 2-Isobutoxymethyl-2-methyl valeraldehyde |

$$(CH_3)_2CH\diagdown\!\!\!\!\underset{H}{\diagup}CHOCH_2\underset{CH_2CH_2CH_3}{\overset{CH_3}{\underset{|}{C}}}-CHO$$

| | |
|---|---|
| Boiling Point: | 113 - 114°C. at 44 mm. |
| Refractive Index: | $n_D^{25} = 1.4212$ |
| Yield: | 50% |

EXAMPLE 5

| | |
|---|---|
| Initial Material: | 2-Vinyl-5,5-dimethyl-m-dioxane |
| Catalyst: | Silica gel |
| Reaction Temperature: | 343 - 354°C. |
| Product: | Allyloxypivalaldehyde |

$$CH_2=CH\diagdown\!\!\!\!\underset{H}{\diagup}CHOCH_2\underset{CH_3}{\overset{CH_3}{\underset{|}{C}}}-CHO$$

| | |
|---|---|
| Boiling Point: | 106 - 107°C. at 104 mm. |
| Refractive Index: | $n_D^{25} = 1.4248$ |
| Yield: | 80% |

EXAMPLE 6

| | |
|---|---|
| Initial Material: | 2-(Cyclohexene-4-yl)-5,5-dimethyl-m-dioxane |
| Catalyst: | Pumice |
| Reaction Temperature: | 400°C. |
| Product: | (1-cyclohexene-4-yl)-methoxy-pivalaldehyde |

$$\underset{H}{\diagup}\overset{\bigcirc}{CHOCH_2}\underset{CH_3}{\overset{CH_3}{\underset{|}{C}}}-CHO$$

| | |
|---|---|
| Boiling Point: | 104 - 105°C. at 6 mm. |
| Refractive Index: | $n_D^{25} = 1.4608$ |
| Yield: | 80% |

EXAMPLE 7

| | |
|---|---|
| Initial Material: | 2,2,5,5-Tetramethyl-m-dioxane |
| Catalyst: | Pumice |
| Reaction Temperature: | 360° - 368°C. |
| Product: | Isopropoxypivalaldehyde |

$$\underset{CH_3}{\overset{CH_3}{\diagdown}}CHOCH_2\underset{CH_3}{\overset{CH_3}{\underset{|}{C}}}-CHO$$

| | |
|---|---|
| Boiling Point: | 155°C. |
| Refractive Index: | $n_D^{25} = 1.4040$ |
| Yield: | 46% |

EXAMPLE 8

| | |
|---|---|
| Initial Material: | 2,2-Tetramethylene-5,5-dimethyl-m-dioxane |
| Catalyst: | Pumice |
| Reaction Temperature: | 357° - 366°C. |
| Product: | Cyclopentoxypivalaldehyde |

$$(CH_2)_4\bigcirc CHOCH_2\underset{CH_3}{\overset{CH_3}{\underset{|}{C}}}-CHO$$

| | |
|---|---|
| Boiling Point: | 93 - 97°C. at 18 mm. |
| Refractive Index: | $n_D^{25} = 1.4421$ |
| Yield: | 61% |

EXAMPLE 9

| | |
|---|---|
| Initial Material: | 2,2-Pentamethylene-5,5-dimethyl-m-dioxane |
| Catalyst: | Pumice |
| Reaction Temperature: | 380° - 390°C. |
| Product: | Cyclohexoxypivalaldehyde |

$$(CH_2)_5\bigcirc CHOCH_2\underset{CH_3}{\overset{CH_3}{\underset{|}{C}}}-CHO$$

| | |
|---|---|
| Boiling Point: | 104° - 109° C. at 19 mm. |
| Refractive Index: | $n_D^{25} = 1.4461$ |
| Yield: | 53% |

EXAMPLE 10

| | |
|---|---|
| Initial Material: | 2-Phenyl-5,5-dimethyl-m-dioxane (Monatsh. 49, 14) |
| Catalyst: | Pumice |
| Reaction Temperature: | 340° - 360°C. |
| Product: | Benzyloxypivalaldehyde |

$$C_6H_5\diagdown\!\!\!\!\underset{H}{\diagup}CHOCH_2\underset{CH_3}{\overset{CH_3}{\underset{|}{C}}}-CHO$$

| | |
|---|---|
| Boiling Point: | 139° - 140°C. at 21 mm. |
| Refractive Index: | $n_D^{25} = 1.4965$ |
| Yield: | 83% |

EXAMPLE 11

| | |
|---|---|
| Initial Material: | 2-p-Tolyl-5,5-dimethyl-m-dioxane |
| Catalyst: | Pumice |
| Reaction Temperature: | 284 - 310°C. |
| Product: | p-Methylbenzyloxy-pivalaldehyde |

$$p\text{-}CH_3C_6H_4\diagdown\!\!\!\!\underset{H}{\diagup}CHOCH_2\underset{CH_3}{\overset{CH_3}{\underset{|}{C}}}-CHO$$

| | |
|---|---|
| Boiling Point: | 118 - 121°C. at 3.5 mm. |
| Yield: | 60% |

EXAMPLE 12

| | |
|---|---|
| Initial Material: | 2-(p-Isopropylphenyl)-5,5-dimethyl-m-dioxane |
| Catalyst: | Pumice |
| Reaction Temperature: | 372 - 383°C. |
| Product: | p-Isopropyl-benzyloxy-pivalaldehyde |

$$p\text{-}(CH_3)_2CHC_6H_4\diagdown\!\!\!\!\underset{H}{\diagup}CHOCH_2\underset{CH_3}{\overset{CH_3}{\underset{|}{C}}}-CHO$$

| | |
|---|---|
| Boiling Point: | 131 - 133°C. at 2 mm. |

Refractive Index: $n_D^{25} = 1.4951$
Yield: 62%

EXAMPLE 13

Initial Material: 2-p-Trifluoromethylphenyl-5,5-dimethyl-m-dioxane
Catalyst: Silica gel
Reaction Temperature: 276 - 292°C.
Product: p-Trifluoromethyl-benzyloxy-pivalaldehyde

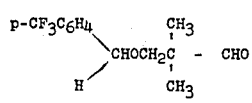

Boiling Point: 111 - 113°C. at 1 mm.
Refractive Index: $n_D^{25} = 1.4540$
Yield: 40%

EXAMPLE 14

Initial Material: 2-p-Chlorophenyl-5,5-dimethyl-m-dioxane
Catalyst: Silica gel
Reaction Temperature: 246 - 256°C.
Product: p-Chlorobenzyloxypivalaldehyde

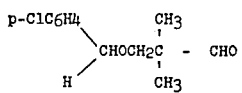

Boiling Point: 127 - 131°C. at 2.5 mm.
Refractive Index: $n_D^{25} = 1.5099$
Yield: 60%

EXAMPLE 15

Initial Material: 2-(2,4-Dichlorophenyl)-5,5-dimethyl-m-dioxane
Catalyst: Silica gel
Reaction Temperature: 315 - 325°C.
Product: 2,4-Dichlorobenzyloxy pivalaldehyde

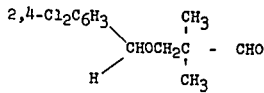

Boiling Point: 128 - 133°C. at 1.4 mm.
Refractive Index: $n_D^{25} = 1.5238$
Yield: 28%

The corresponding 2,6-dichloro and 3,4-dichloro isomers have also been prepared from the respectively isomeric initial benzaldehydes. The products had the following characteristics:

2,6-dichlorobenzyloxy pivalaldehyde; b.p. 127° - 132°C. at 1 mm.; $n_D^{25}$ 1.5266; yield 36%

3,4-dichlorobenzyloxy pivalaldehyde; b.p. 146° - 148°C. at 2 mm.; $n_D^{25}$ 1.5231; yield 45%

EXAMPLE 16

Initial Material: 2-(Tetrahydro-2-furyl)-5,5-dimethyl-m-dioxane
Catalyst: Silica gel
Reaction Temperature: 372 - 399°C.
Product: Tetrahydro-2-furylmethoxy pivalaldehyde

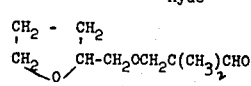

Boiling Point: 135 - 138°C. at 34 mm.
Refractive Index: $n_D^{25} = 1.4488$
Yield: 52.5%

EXAMPLE 17

Initial Material: 2-isopropyl-5-ethyl-5-allyloxymethyl-m-dioxane
Catalyst: Silica gel
Reaction Temperature: 340 - 356°C.
Product: 2-isobutoxymethyl-2-allyloxy methyl butyraldehyde

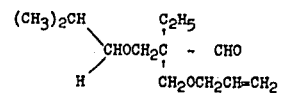

Boiling Point: 109°C. at 5 mm.
Refractive Index: $n_D^{25} = 1.4378$
Yield: 20 - 40%

EXAMPLE 18

Initial Material: 2-n-Propyl-5-methyl-5-vinyl-m-dioxane
Catalyst: Pumice
Reaction Temperature: 402 - 417°C.
Product: 3-n-butoxy-2-methyl-2-vinyl propionaldehyde

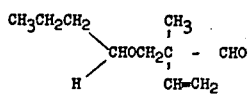

Boiling Point: 95°C. at 12 mm.
Refractive Index: $n_D^{25} = 1.4384$
Yield: 20%

EXAMPLE 19

Initial Material: 2-(1',1'-dimethyl-2'-isobutoxyethyl)-5,5-dimethyl-m-dioxane

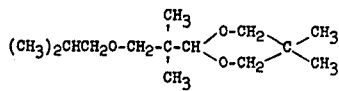

Catalyst: Pumice
Reaction Temperature: 398 - 411°C.
Product: (1,1,5-trimethyl-3-oxahexyl)-pivalaldehyde

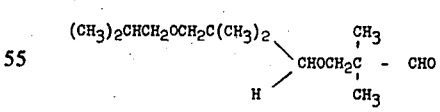

Boiling Point: 127°C. at 18 mm.
Refractive Index: $n_D^{25} = 1.4199$
Yield: 75%

EXAMPLE 20

Initial Material: 2-n-Undecyl-5,5-dimethyl-m-dioxane
Catalyst: Pumice
Reaction Temperature: 410 - 440°C.
Product: n-Dodecyloxypivalaldehyde

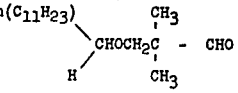

Boiling Point: 142 - 145°C. at 2.5 mm.
Refractive Index: $n_D^{25} = 1.4380$
Yield: 60%

EXAMPLE 21

Initial Material: 3-Isopropyl-2,4-dioxaspiro[5,5]-undecene-8

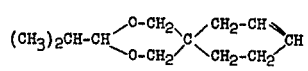

Catalyst: Pumice
Reaction Temperature: 402 - 418°C.
Product: 1-Isobutoxymethyl-3-cyclohexene-1-aldehyde

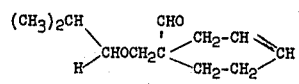

Boiling Point: 106°C.
Refractive Index: $n_D^{25} = 1.4610$
Yield: 75%

EXAMPLE 22

Initial Material: 2-Isopropyl-5,5-pentamethylene-m-dioxane

Catalyst: Pumice
Reaction Temperature: 405 - 416°C.
Product: 1-(Isobutoxymethyl)-cyclohexane-1-aldehyde

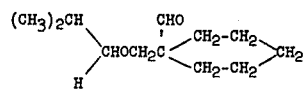

Boiling Point: 105 - 106°C. at 8 mm.
Refractive Index: $n_D^{25} = 1.4508$
Yield: 47%

EXAMPLE 23

Initial Material: Bis-(5,5-dimethyl-m-dioxan-2-yl)methane

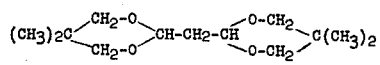

Catalyst: Silica gel
Reaction Temperature: 344 - 368°C.
Product: 2,2,11,11-Tetramethyl-4,8-dioxa-1,11-undecanedial

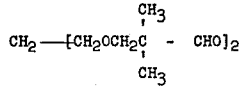

Boiling Point: 115°C. at 1.2 mm.
Refractive Index: $n_D^{25} = 1.4399$
Yield: 25%

EXAMPLE 24

Initial Material: 1,2-bis-(5',5'-dimethyl-m-dioxane-2'-yl)ethane

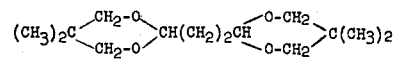

Catalyst: Silica gel
Reaction Temperature: 310 - 368°C.
Product: 2,2,11,11-Tetramethyl-4,9-dioxa-1,12-dodecanedial $OCHC(CH_3)_2CH_2O(CH_2)_4OCH_2C(CH_3)_2CHO$ Boiling Point: 136 - 137°C. at 2.7 mm.
Refractive Index: $n_D^{25} = 1.4440$
Yield: 25%

EXAMPLE 25

Initial Material: 1,3-bis-(5',5'-dimethyl-m-dioxan-2'-yl)propane

Catalyst: Silica gel
Reaction Temperature: 339 - 363°C.
Product: 2,2,12,12-Tetramethyl-4,10-dioxa-1,13-tridecanedial $OCHC(CH_3)_2CH_2O(CH_2)_5OCH_2C(CH_3)_2CHO$ Boiling Point: 150°C. at 1.2 mm.
Refractive Index: $n_D^{25} = 1.4452$
Yield: 25%

CONVERSIONS OF β-ALKOXY ALDEHYDE PRODUCTS

In general, any of the novel aldehydes produced in the above examples may be subjected to conversions, well-known in the art, to produce therefrom useful conversion products. They can all be oxidized to carboxylic acids, or on the contrary reduced to the corresponding alcohols. They may also be reacted with various compounds to produce various novel heterocyclic or linear products, as indicated by the following equations, in which the symbol Q stands for the chain:

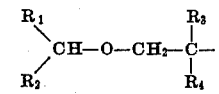

wherein $R_1$, $R_2$, $R_3$ and $R_4$ are defined as above.

a. The 2,4-dinitrophenylhydrazone of the isobutoxypivalaldehyde of Example 1 was prepared by a standard method. Recrystallization from alcohol gave crystals, m.p. 123.8° to 124.8° C.

The semicarbazone was prepared and recrystallized from aqueous ethanol; it had a m.p. of 133.4° to 134.4° C.

β-Isobutoxypivalaldehyde (obtained as in Example 1) was oxidized to β-isobutoxypivalic acid with potassium permanganate in water, and in another experiment with air in the presence of cobaltous ions. The purified acid boiled at 84° C. at 0.7 mm., $n_D^{25}$ 1.4207, $d_{25}^{25}$ 0.9469. The infra-red spectrum exhibited absorptions due to a carboxyl group and the ether group (8.95 microns).

A by-product of the oxidation was the known dimethylmalonic acid, characterized by its melting point, mixed melting point with an authentic specimen and its infra-red spectrum.

β-Isobutoxypivalic acid obtained as above was converted to the acid chloride which was, in turn, converted to the amide by standard means; m.p. 36.5° to 38° C.

b. Twenty parts of polyvinyl alcohol, molecular weight 3,000 to 6,000, were dissolved in 100 parts of water by heating briefly at 80° C. To about 25 parts of the resulting solution, 0.50 part of 2,2,12,12-tetramethyl-4,10-dioxa-1,13-tridecanedial, product of Example 25 was added, and the pH of the mixture adjusted to 1.5 by the addition of concentrated HCl. The mixture was tumbled for 4 hours, and allowed to stand overnight. The stiff gel product was a cross-linked polymeric reaction product of the polyvinyl alcohol with the dialdehyde, and has the same utility as cross-linked polyvinyl alcohols generally. At the present time a textile fiber is manufactured from polyvinyl alcohol cross-linked with formaldehyde.

When a higher molecular weight polyvinyl alcohol is used or a higher reaction temperature, the rate of gelation is considerably increased.

c) Reaction with pyrroles:

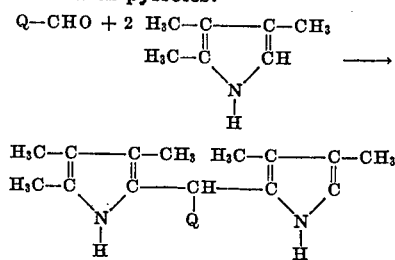

d) Reaction with 1,2-diketones and ammonia to give imidazoles:

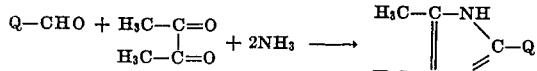

e) Reaction with 2,3-diaminoquinoxaline to give imidazoquinoxalines:

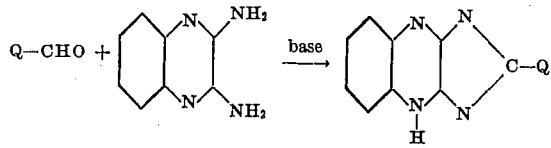

f) Reaction with cyanohydrins to give 2-substituted oxazoles:

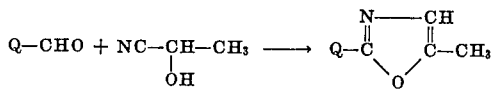

g) Reaction with 1,2-aminomercaptans in the presence of an oxidizing agent to give 2-substituted thiazoles, and with o-aminothiophenols to give benzothiazoles:

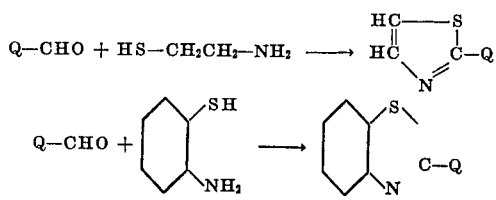

h) Reaction with β-phenylethylamine to give isoquinolines:

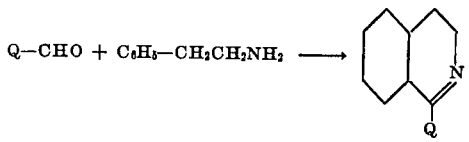

i) Reaction with heterocyclic compounds having a reactive $CH_3$ group (e.g., 2-methylthiazole, α-picoline or quinaldine) to give corresponding ethylidene compounds:

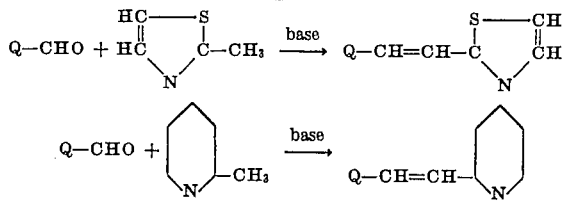

j) Reaction with active methylene compounds, such as diethyl malonate, to give the corresponding alkylidene compounds:

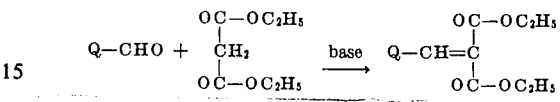

Many other achievable conversions will be readily apparent to those skilled in the art. In all cases, the use of our novel products as intermediates has the advantage that the absence of free H-atoms on the α-C atom (with respect to the CHO group) precludes self-condensation and leads to purer conversion products than are obtainable with aldehydes, such as acetaldehyde, which do have hydrogen on the α-C atom.

The carboxylic acids obtained by oxidation of our novel aldehydes, are readily convertible to the lithium salts by treatment with a solution of lithium hydroxide or lithium carbonate. The dry lithium salt of β-isobutoxypivalic acid has been found to be an efficient anti-knock agent in petroleum fuels for use in internal combustion engines of the fuel injection type.

It will be noted that our novel process is adapted for the production both of saturated and unsaturated aldehydes. Illustrations of the latter types are given in Examples 5, 6, 17 and 18. By polymerizing such unsaturated aldehydes with vinyl-type monomers, aldehyde-containing polymers may be obtained.

The novel dialdehydes can be used as cross-linking groups in polymers, as illustrated in Conversion (b) above.

It is to be understood that the preceding examples are representative and that said examples may be varied within the scope of the total specification, as understood by one skilled in the art, to produce essentially the same results.

As many widely different embodiments of this invention may be made without departing from the spirit and scope thereof, it is to be understood that this invention is not limited to the specific embodiments thereof, except as defined in the appended claims.

We claim:

1. A β-alkoxy aldehyde represented by the formula:

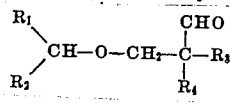

wherein $R_1$ is hydrogen, an alkyl group of one to eleven carbons or vinyl group, $R_2$ is hydrogen or methyl, $R_3$ is an alkyl group of one to two carbons; and $R_4$ is an alkyl group of one to three carbons or vinyl.

* * * * *